US 6,634,321 B2

(12) United States Patent
Hussain et al.

(10) Patent No.: US 6,634,321 B2
(45) Date of Patent: Oct. 21, 2003

(54) SYSTEMS AND METHOD FOR STORING HYDROGEN

(75) Inventors: Syed Hussain, Anaheim Hills, CA (US); Neel Sirosh, Irvine, CA (US)

(73) Assignee: Quantum Fuel Systems Technologies Worldwide, Inc., Irvine, CA (US)

( * ) Notice: Subject to any disclaimer, the term of this patent is extended or adjusted under 35 U.S.C. 154(b) by 0 days.

(21) Appl. No.: 09/738,276

(22) Filed: Dec. 14, 2000

(65) Prior Publication Data

US 2002/0117123 A1 Aug. 29, 2002

(51) Int. Cl.[7] .............................................. F02B 43/08
(52) U.S. Cl. ...................... 123/3; 123/DIG. 12; 95/116
(58) Field of Search .................... 123/1 A, 3, DIG. 12; 62/46.2, 46.3, 48.1; 423/439; 95/116

(56) References Cited

U.S. PATENT DOCUMENTS

| 4,216,198 A | * | 8/1980 | Simons ................... 423/658.2 |
| 5,067,447 A | * | 11/1991 | Iwaki et al. .................... 123/3 |
| 5,653,951 A | * | 8/1997 | Rodriguez et al. .......... 423/439 |
| 6,113,673 A | * | 9/2000 | Loutfy et al. ................. 95/116 |
| 6,432,176 B1 | * | 8/2002 | Klos et al. ................. 96/117.5 |

FOREIGN PATENT DOCUMENTS

| JP | 57-129801 A | * | 8/1982 |
| JP | 62-246699 A | * | 10/1987 |

* cited by examiner

Primary Examiner—Noah P. Kamen
(74) Attorney, Agent, or Firm—Morrison & Foerster LLP

(57) ABSTRACT

Devices and methods for storing hydrogen fuels or other gaseous fuels. One embodiment of a container for storing gaseous fuels in accordance with an aspect of the invention comprises a high-pressure vessel configured to contain the gas in a high-pressure zone at a pressure significantly above atmospheric pressure. The container can also include a storing medium in the vessel and an inlet/outlet line extending through the vessel. The storing medium can have a plurality of storage spaces configured to physically bind molecules of the gas to the storing medium, and the inlet/outlet line can be a tube extending through the vessel in fluid communication with the storing medium. In operation, the high-pressure vessel is pressurized with a gaseous fuel (e.g., hydrogen) to a pressure significantly above atmospheric pressure (e.g., approximately 3,000–10,000 psi). The molecules of the gaseous fuel bind to the storing medium, and the pressure in the vessel drives additional molecules of the gaseous fuel into vacant spaces within the storing medium or in other regions of the vessel.

50 Claims, 10 Drawing Sheets

SYSTEMS AND METHOD FOR STORING HYDROGEN

TECHNICAL FIELD

The present invention is generally directed toward vessels for storing hydrogen fuels onboard vehicles.

BACKGROUND

Petroleum fuels are currently the primary fuels for operating internal combustion engines and turbines in vehicles, generators and many other applications. Gasoline and diesel, for example, are currently the most popular fuels for operating cars, trucks, machinery and other motorized equipment. It is estimated that the transportation sector consumes nearly 50% of the total petroleum fuels consumed in the United States. One problem of using petroleum fuels is that they produce a significant amount of air pollution. The United States recognized this problem in the 1990 Clean Air Act and the 1992 Energy Policy Act. Another serious problem of using petroleum fuels is that the United States and other industrialized countries import more than 50% of the oil that they consume. As a result, the economies and the national security of many industrialized countries are susceptible to production controls and foreign policy concerns of foreign petroleum producing countries. Therefore, it is well recognized that there is a high demand for systems that can generate, distribute and use abundant and clean transportation fuels.

Hydrogen is one of the most promising fuels that is being considered to replace petroleum fuels for the transportation sector. In the case of vehicles, hydrogen fuel-cells that generate electricity from a flow of hydrogen are being used to power electric automobile engines, and combustion engines that burn hydrogen are being used in other applications. One advantage of using hydrogen is that it does do not produce air pollution. An advantage of using hydrogen fuel-cells is that vehicles will not need to carry large, heavy batteries to store electrical power because the hydrogen fuel-cells provide a power plant onboard the vehicles. As a result, electrical vehicles with hydrogen fuel-cells are expected to be lighter and more efficient than existing battery-powered electrical vehicles. Hydrogen fuels also provide more energy than either gasoline or natural gas on a per-weight basis, and hydrogen is also readily abundant from resources within the borders of the United States and other industrialized countries. Hydrogen fuels may accordingly reduce the economic and foreign policy concerns caused by importing a significant percentage of the petroleum fuels. Therefore, it would be very beneficial to replace gasoline and diesel with hydrogen as a viable fuel for the transportation sector.

The implementation of a national energy economy based on hydrogen fuels will require the development of many systems and processes to make hydrogen fuels as safe and convenient to use as gasoline or diesel. One area of hydrogen fuel technology that needs further development is storing hydrogen onboard a vehicle. Although hydrogen has more energy than gasoline on a per-weight basis, it has a much lower energy/volume than gasoline. As a result, conventional hydrogen storage systems require a much larger storage vessel than gasoline tanks to provide the same operating range for a vehicle. In most vehicles, however, the space allotted for storing fuels is much smaller than the volume required for an onboard hydrogen storage vessel. Therefore, a significant amount of research and development is being directed toward providing cost-effective storage vessels that can store a sufficient amount of hydrogen within the limited volume of an onboard fuel tank to provide approximately the same range as conventional gasoline powered vehicles.

Existing systems for storing hydrogen onboard vehicles include containers of compressed or liquefied hydrogen, and hydrogen stored in metal hydrides. According to the Department of Energy, the energy density goals for storing hydrogen onboard vehicles are 6.5 weight percent $H_2$ and 62 kg $H_2/m^3$. Existing storage systems for compressed or liquefied hydrogen are generally high-pressure storage vessels with a vacant cavity that can hold approximately 6.7 weight percent $H_2$ and 20 kg $H_2/m^3$ at a pressure of 5000 psi. Although it is possible to increase the energy density of hydrogen in high-pressure storage vessels by increasing the pressure, it not only takes a significant amount of energy to pressurize the gas in such vessels, but the storage vessels must also be more robust to withstand the higher pressures. As a result, it may not be feasible to achieve an adequate energy density to match the operating range of conventional gasoline powered vehicles with existing high-pressure storage vessels.

Another system for storing hydrogen, which is less developed than high-pressure storage vessels, is gas-on-solid adsorption. A particularly promising gas-on-solid adsorption material is a carbon nanotube structure, which can have single-wall carbon nanotubes and multi-wall carbon nanotubes. Single-wall carbon nanotubes are single elongated cylinders of carbon, and multi-wall carbon nanotubes have concentrically arranged cylinders of elongated carbon (i.e., a tube within a tube). The diameter of the carbon cylinders is determined by the manufacturing process and can be less than 2 nm, and the nanotubes can be formed into bundles of generally parallel nanotubes because of van der Waals interaction. In general, a bundle of carbon nanotubes form a porous medium in which $H_2$ atoms fill the pores by capillary action. In theory, it has been shown that mediums formed from carbon nanotubes can store up to 8.4 weight percent $H_2$ and 82 kg $H_2/m^3$. Although such an energy density is highly desirable, it may be difficult to achieve this energy density outside of laboratory conditions. Therefore, carbon nanotubes alone may not provide an adequate energy density to meet the goals set by the Department of Energy for commercial transportation applications.

The state of the art of existing and experimental systems for storing hydrogen onboard vehicles currently falls short of providing the same range between fill-ups as conventional gasoline powered vehicles. Thus, it would be highly desirable to develop an onboard hydrogen storage system that can (a) fit within the limited amount of space provided for fuel tanks on most vehicles and (b) store enough hydrogen to power a vehicle for a range of approximately 300 miles.

SUMMARY SECTION

The present invention is directed toward devices and methods for storing hydrogen fuels or other gaseous fuels. One embodiment of a container for storing gaseous fuels in accordance with an aspect of the invention comprises a high-pressure vessel configured to contain the gas in a high-pressure zone at a pressure significantly above atmospheric pressure. The container can also include a storing medium in the vessel and an inlet/outlet line extending through the vessel. The storing medium can have a plurality of storage spaces configured to physically bind molecules of the gas to the storing medium, and the inlet/outlet line can be a tube extending through the vessel in fluid communication with the storing medium. In operation, the high-pressure vessel is pressurized with a gaseous fuel (e.g., hydrogen) to a pressure significantly above atmospheric pressure (e.g., approximately 3,000–10,000 psi). The molecules of the gaseous fuel bind to the storing medium, and the pressure in the vessel drives additional molecules of the gaseous fuel into vacant spaces within the storing medium or in other regions of the vessel.

In one embodiment, the high-pressure vessel comprises a composite shell having a closed-end and an open-end, an end-cover attached to the open-end of the shell to define a high-pressure zone, and a divider configured to separate the high-pressure zone into cells. The storing medium can be an adsorbent material comprising carbon nanotubes configured to adsorb $H_2$ molecules, and the storing medium can be positioned in the cells. Additionally, the inlet/outlet line can be a porous tube extending along virtually the full length of the high-pressure zone, and the vessel can further include an in-tank regulator or external regulator coupled to the inlet/outlet line.

DETAILED DESCRIPTION

The following disclosure describes several embodiments of containers for storing hydrogen fuels or other gaseous fuels onboard vehicles and other types of machines. One embodiment of a container for storing gaseous fuels in accordance with an aspect of the invention includes a high-pressure vessel, a storing medium in the vessel, and an inlet/outlet line extending through at least a portion of the vessel. The vessel is generally configured to contain the gaseous fuel in a high-pressure zone at a pressure significantly above atmospheric pressure. The storing medium can be a material that adsorbs molecules of the gaseous fuel. The storing medium, for example, can have a plurality of nano-scale storage spaces configured to physically bind molecules of the gaseous fuel to the storing medium. The inlet/outlet line generally extends across the vessel and is in fluid communication with the storing medium to fill or withdraw gas from the vessel. Although many containers in accordance with the invention can store gaseous fuels other than hydrogen, the embodiments of the containers described below will be explained in the context of storing hydrogen in the form $H_2$. It will be appreciated that the vessels and the storing medium can be configured to store other gaseous fuels, such as compressed natural gas (CNG). Many specific details of certain embodiments of the invention are set forth in the following description and in FIGS. 1–9 to provide a thorough understanding of these embodiments. One skilled in the art, however, will understand that the present invention will have additional embodiments, or that the invention may be practiced without several of the details described below.

Figure 1:
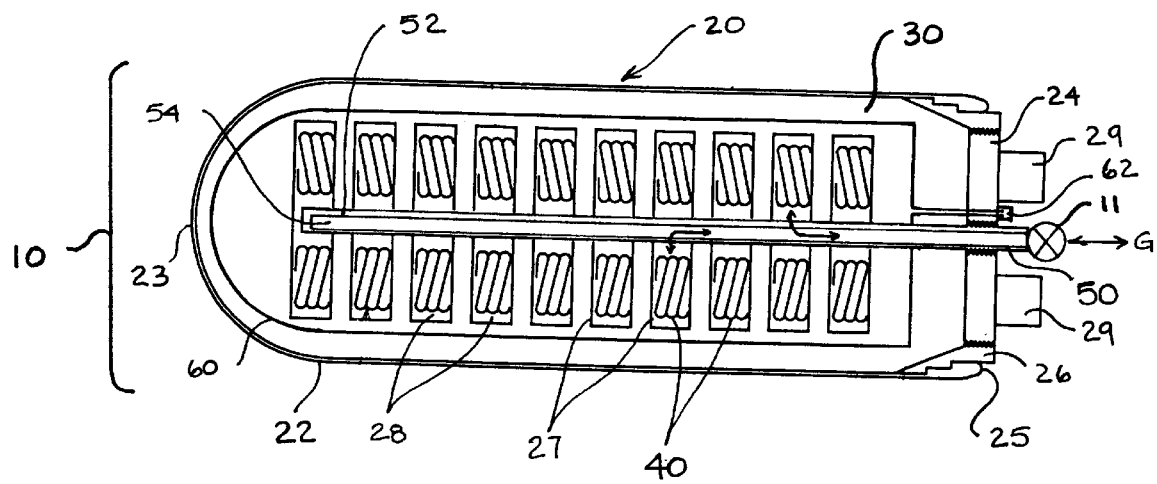
FIG. 1 is a cross-sectional view of a container for storing gaseous fuels in accordance with an embodiment of the invention.
Figure 2:
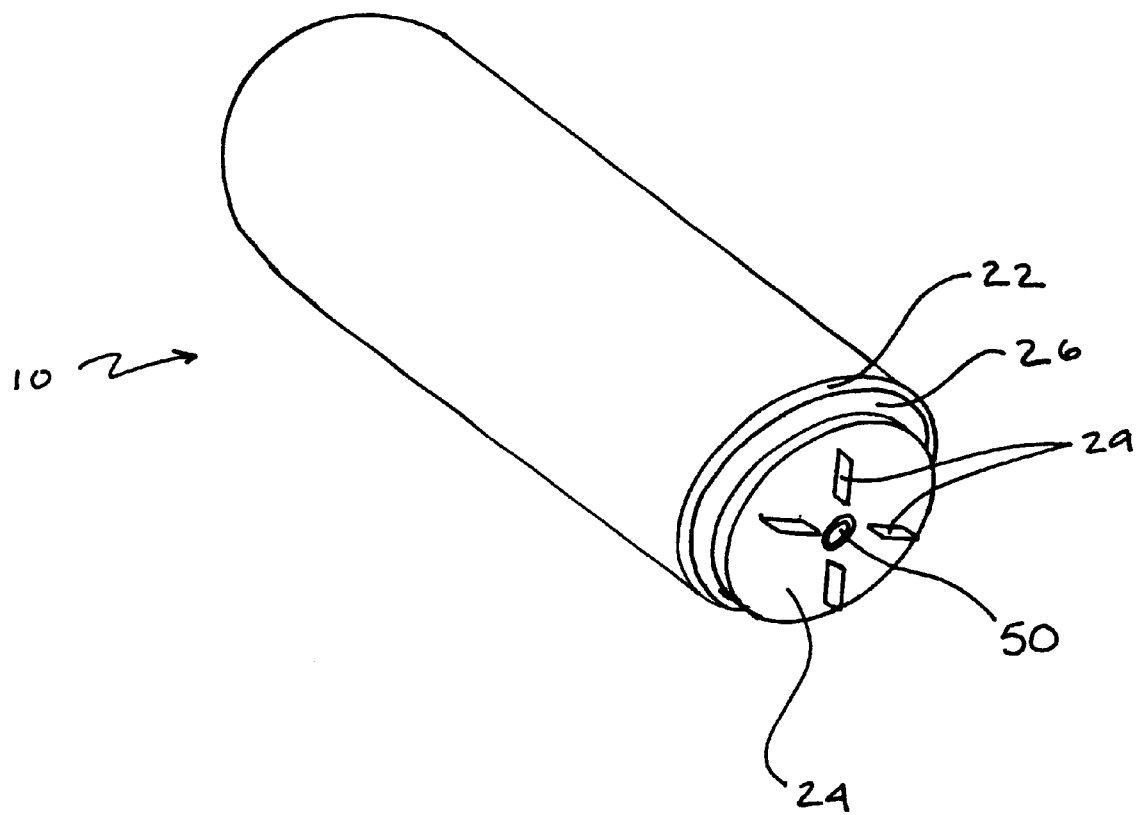
FIG. 2 is an isometric view of the container shown in FIG. 1.

FIG. 1 is a cross-sectional view and FIG. 2 is an isometric view of a container 10 for storing gaseous fuels onboard vehicles or other machinery in accordance with an embodiment of the invention. Referring to FIG. 1, this embodiment of the container 10 includes a high-pressure vessel 20, a storing medium 40 within the vessel 20, an inlet/outlet line 50 extending through at least a portion of the vessel 20, and an extraction element 60 within the vessel 20. The container 10 is filled by pumping a gaseous fuel G, such as hydrogen ($H_2$) or Compressed Natural Gas (CNG), through the line 50 and into the vessel 20. The line 50 can be a porous tube or a perforated pipe such that the gas G can pass through the line 50 and into the storing medium 40. The molecules of the gas G bond to surfaces the storing medium 40 to fill small molecular spaces within the storing medium 40, and the molecules of the gas G are also compressed to a pressure significantly above atmospheric pressure to increase the density of the gas molecules in larger vacant spaces of the storing medium 40 and the vessel 20. The gas G is extracted from the vessel 20 by activating the extraction element 60 to detach the gas molecules from the surfaces of the storing medium 40 (e.g., desorb the gas molecules from the storing medium). When a valve 11 is opened in the line 50, the pressure in the vessel 20 drives the gas molecules in the vessel 20 through the wall of the line 50 and out of the vessel 20. Several embodiments of the components of the container 10 will now be described in more detail.

The vessel 20 can include a shell 22 and an end-cover 24 attached to the shell 22. The shell 22 can have a closed-end 23 defining one end of the vessel 20, an open-end 25 defining another end of the vessel 20, and a fitting 26 coupled to the open-end 25. In an alternative embodiment, the shell 22 can have an open-end on each end, and the vessel 20 can include a separate end-cover attached to each open-end of the vessel. The shell 22 can be a thin-wall composite structure having a fiber/resin outer layer, a carbon-fiber inner layer, and a polymer liner inside of the inner layer. One suitable thin-wall composite shell 22 is the TriShield Composite Cylinder manufactured by IMPCO Technology and Automotive OEM Division of Irvine, Calif. The end-cover 24 can be threadedly attached to the fitting 26, and the end-cover 24 can also be a composite plate. The vessel 20 can also include a plurality of dividers 27 defining a plurality of individual cells 28. The dividers 27 can be perforated plates, mesh, or other materials through which the gas G can flow to provide fluid communication between the cells 28. Alternatively, the dividers 27 can be solid plates to define separate cells 28 that have fluid communication only via the line 50. The embodiment of the dividers 27 shown in FIG. 1 are modular compartments that define discrete cells 28 which can be separately attached to the inlet/outlet line 50. The embodiment of the cells 28 shown in FIG. 1 do not necessarily completely fill the vessel 20, but in other embodiments of the container the cells 28 can be configured to occupy the entire volume of the vessel 20. The vessel 20 can also include a plurality of fins 29 projecting from the end-cover 24. The fins 29 are typically thin, metal plates that transfer heat away from the vessel 20. In an alternative embodiment, the shell 22, the end-cover 24, and the fins 29 can all be composed of a suitable metal, such as aluminum.

The shell 22 and the end-cover 24 define a high-pressure zone or cavity 30 that can be pressurized to a pressure significantly above atmospheric pressure. In one embodiment, the shell 22 is configured to contain the gaseous fuel G at a pressure above approximately 3,000 psi. For example, when the shell 22 is a thin-wall composite structure similar to the TriShield Composite Cylinder manufactured by IMPCO, then the vessel 20 can be configured to contain the gaseous fuel G at a pressure of approximately 3,000–50,000 psi, and more preferably approximately 3,500–10,000 psi. It will be appreciated that some embodiments of the vessel can be operated at pressures less than 3,000 psi and greater than 50,000 psi.

Referring still to FIG. 1, the cells 28 hold separate sections of the storing medium 40 in the vessel 20. The storing medium 40 can be an absorbent material having a plurality of surfaces that are configured to form a physical bond with the molecules of the gaseous fuel G. In the case of storing hydrogen, the structure of the storing medium 40 can be configured to have surfaces that are spaced apart by a distance that allows the hydrogen molecules to fill the spaces in the storing medium 40 by capillary action. In one embodiment, the storing medium 40 is a porous material having pores configured to form a physical bond with hydrogen molecules ($H_2$). For example, the storing medium 40 can be a porous material having an average pore size of approximately 0.3–2.0 nm. One suitable storing medium 40 for use in the cells 28 is a carbon nanotube material. The carbon nanotube material can be a single-wall carbon nanotube structure or a multi-wall carbon nanotube structure. Suitable methods for making carbon nanotube materials that can be used for the storing medium 40 to store hydrogen are set forth in Dillon, A. C., et al., *Carbon Nanotube Materials For Hydrogen Storage*, Proceedings Of The 1999 DOE/NREL Hydrogen Program Review, Golden Co., 1999, which is herein incorporated by reference. The storing medium 40 can also be composed of other materials with nanopores or combination of carbon nanotube materials and other substances.

Figure 3:
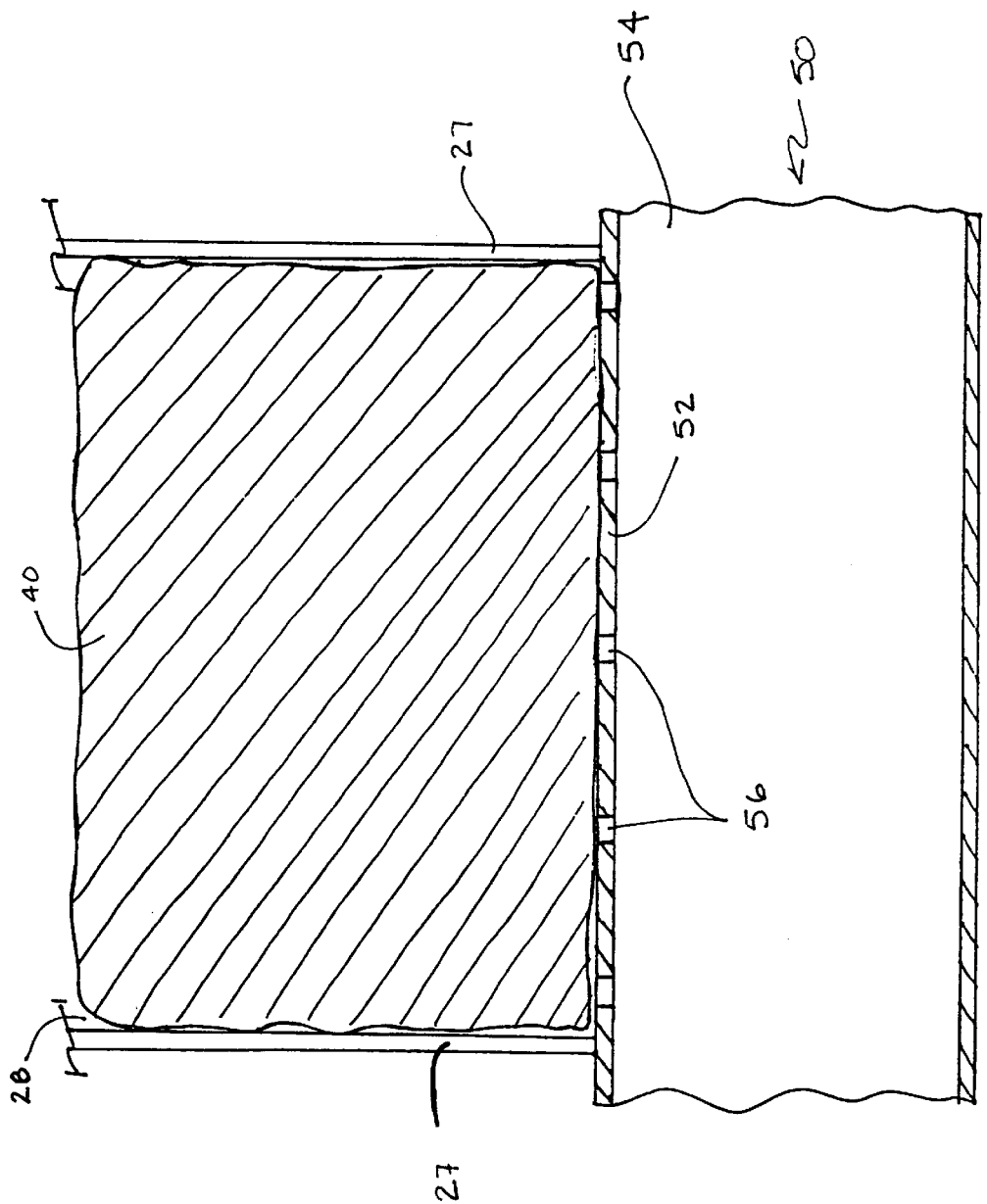
FIG. 3 is a cross-sectional view schematically illustrating a portion of a container for storing gaseous fuels in accordance with an embodiment of the invention.
Figure 4:
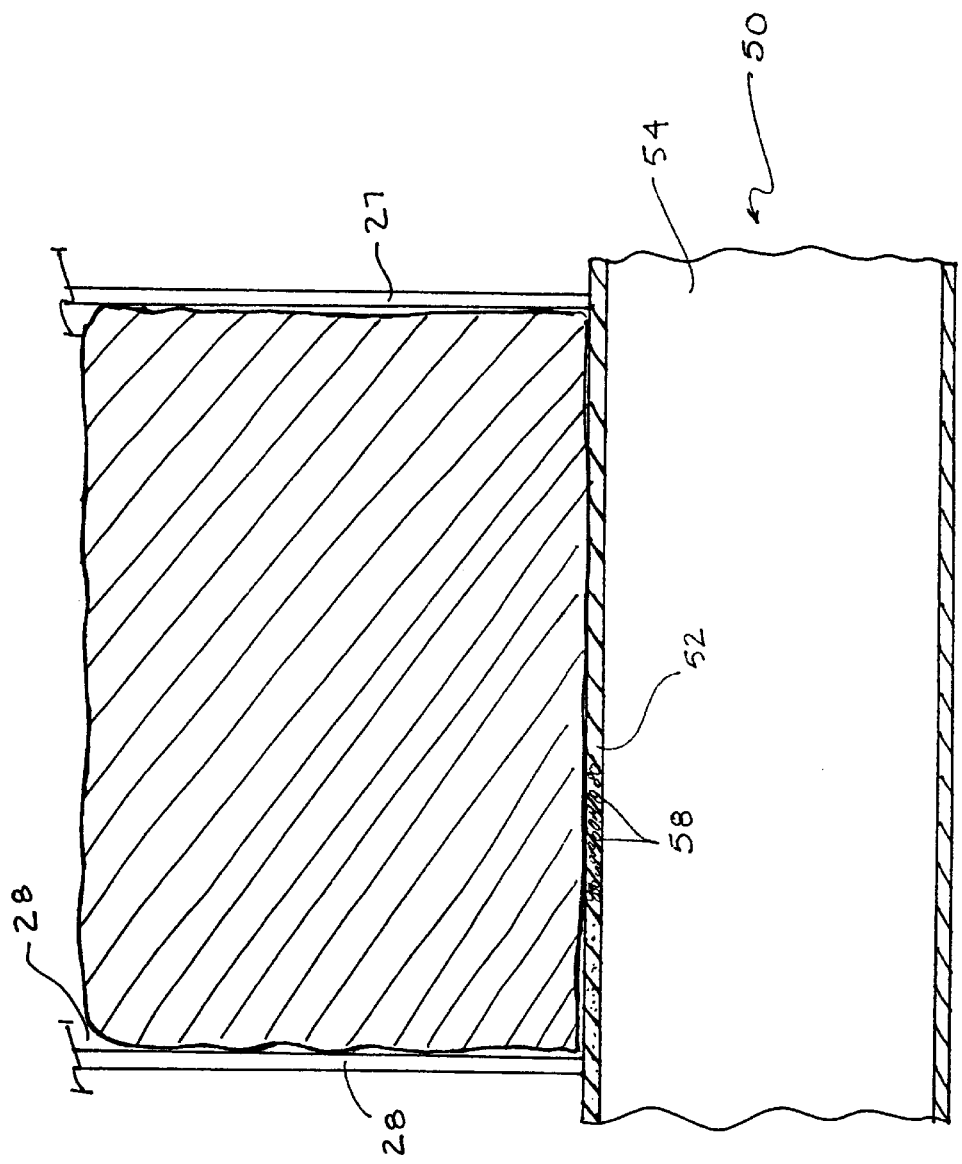
FIG. 4 is a cross-sectional view schematically illustrating a portion of a container for storing gaseous fuels in accordance with another embodiment of the invention.

FIGS. 3 and 4 are cross-sectional views illustrating a portion of the inlet/outlet line 50 and one of the cells 28 in greater detail. Referring to FIG. 3, this embodiment of the inlet/outlet line 50 is a perforated pipe or tube having a wall 52, channel 54, and a plurality of apertures 56. The wall 52 can form a thin, solid cylindrical tube, and the apertures 56 can be holes or other types of perforations in the wall 52. A fine mesh (not shown) can cover the apertures 56 to prevent small particles from the retaining medium 40 from falling into the channel 54. In operation, the gaseous fuel G flows through the apertures 56 in the wall 52 to provide fluid communication between the channel 54 and the storing medium 40 in the cell 28. Referring to FIG. 4, this embodiment of the inlet/outlet line 50 has a porous wall 52, a channel 54, and a plurality of pores 58 in the wall 52. In operation, the gaseous fuel G flows through the pores 58 to provide fluid communication between the channel 54 and the storing medium 40 in the cell 28. The porous inlet/outlet line 50 shown in FIG. 4 can be a sintered metal tube, a porous ceramic material, or another suitable porous material. In either embodiment, the line 50 can extend across all, or almost all, of the cavity within the vessel 20 to provide a conduit within the vessel 20 for the gas to readily flow to each cell 28. The inlet/outlet line 50 accordingly sacrifices some of the volume in the vessel 20 that could be occupied by the storage medium 40 so that the gas molecules can flow more easily into and out of the storing medium 40 housed within the cells 28.

Referring still to FIG. 1, the extraction element 60 is positioned within the cavity 30 of the vessel 20. The extraction element 60 can be a heating element, such as an electrical heating element or another suitable source of heat. The extraction element 60 can alternatively be an ultrasound generator or another type of energy source that emits energy within the vessel 20. The extraction element 60 is coupled to a connector 62 on the end-cover 24 to couple a power source to the extraction element 60. In general, the energy emitted by the extraction element 60 detaches or otherwise desorbs gas molecules bonded to the storing medium 40. In one embodiment, the energy excites the gas molecules or otherwise breaks the bonds between the gas molecules and the surfaces of the storing medium 40. For example, when the extraction element 60 is a heating element and the storing medium 40 comprises a carbon nanotube structure, the heat emitted from the extraction element 60 causes the gas molecules to separate from the storing medium 40.

The container 10 can be constructed by providing the shell 22 with the fitting 26 attached to the open-end 25. The dividers 27, the storing medium 40, the inlet/outlet line 50, and the extraction element 60 can be assembled outside of the vessel 20. This assembly can then be installed in the cavity 30 of the vessel 20, and the end-cover 24 can be attached to the fitting 26. Alternatively, the dividers 27, the storing medium 40, the line 50, and the extraction element 60 can be assembled as they are installed in the cavity 30 of the vessel 20. At this point, the container 10 can be filled with the gaseous fuel to a pressure of approximately 3,000–10,000 psi, or other pressures that are appropriate for the particular application.

Figure 5A:
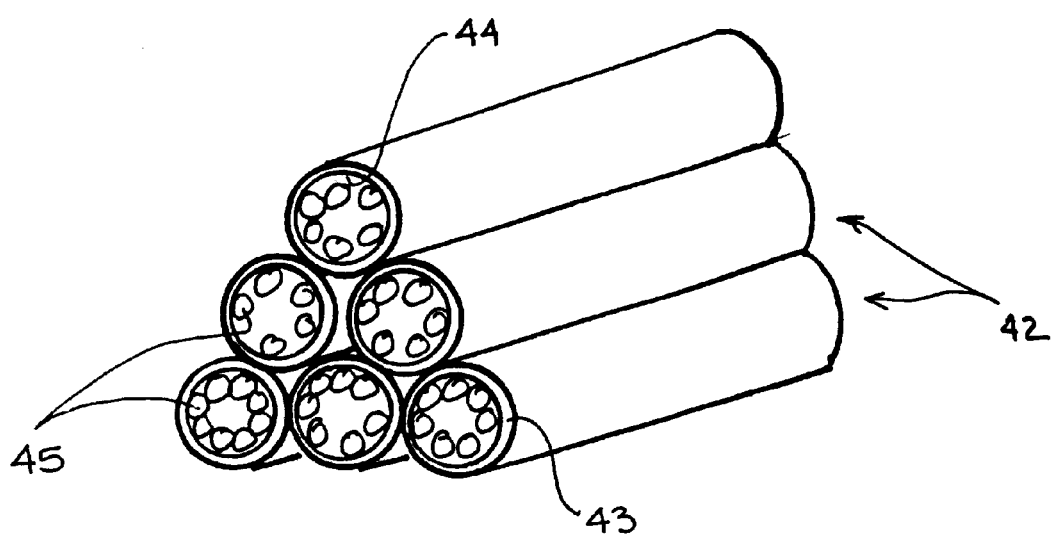
FIGS. 5A and 5B are cross-sectional views of an absorbent medium having a bundle of carbon nanotubes for use in a container for storing gaseous fuels in accordance with an embodiment of the invention.
Figure 5B:
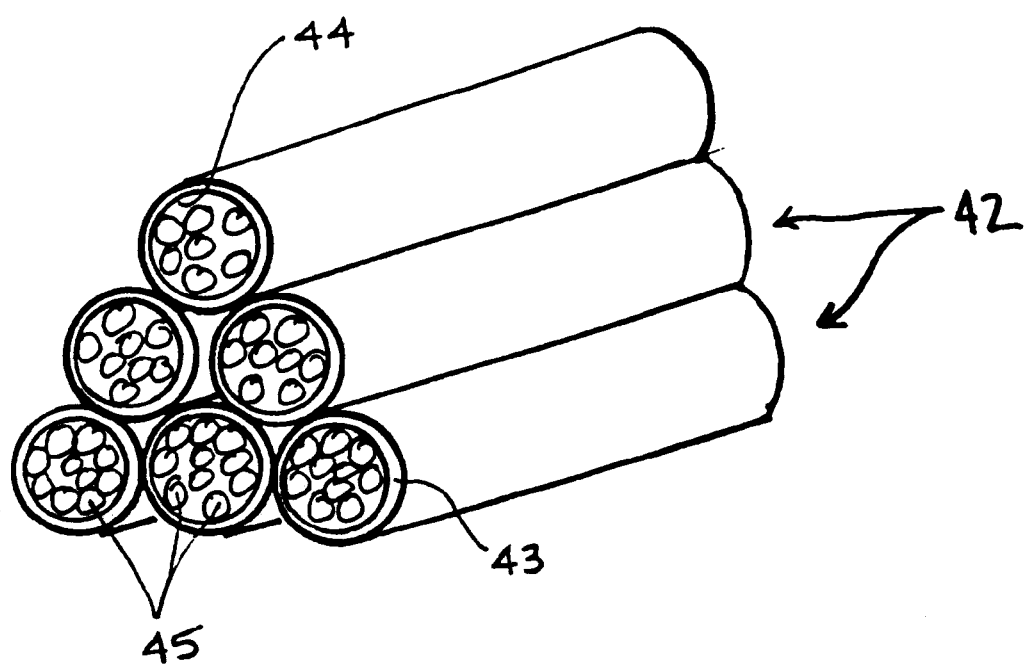

FIGS. 5A and 5B are schematic cross-sectional views illustrating an expected operation of a storing medium 40 comprising a bundle of single-wall carbon nanotubes at a molecular level. It should be noted that these figures are based, at least in part, on theory, and the actual operation of the carbon nanotube storing medium 40 at the molecular level may be different.

The carbon nanotube storing medium 40 of this embodiment comprises a plurality of nanotubes 42 having carbon lattice walls 43 with internal retaining surfaces 44. The carbon lattice walls 43 of the nanotubes 42 are generally lattices having a monolayer of carbon atoms. The diameter or pore size of the nanotubes 42 may vary or it may be fairly consistent between tubes in a bundle. For example, the pore size of the nanotubes 42 can be approximately 0.3–2.0 nm. The pore size affects the ability of the carbon nanotubes 42 to physically bind a plurality of $H_2$ molecules 45 to the internal surfaces 44. The $H_2$ molecules 45 can bind to the surfaces 44 of the nanotubes 42 under capillary action. The nanotubes 42, therefore, should be sufficiently small to cause the $H_2$ molecules 45 to naturally migrate along the surfaces 42.

Referring to FIG. 5A alone, the bundle of carbon nanotubes 42 is shown in a low pressure state in which a plurality of $H_2$ molecules 45 occupy at least a portion of the nanotubes 42. The $H_2$ molecules 45 are physically bound to the surfaces 44 of the nanotubes 42. Hydrogen H$_2$ molecules, however, may only have a van der Waals diameter of 2.89 Å. As such, a significant amount of usable volume in 0.1–2.0 nm carbon nanotubes may not contain any H$_2$ molecules 45.

Referring to FIG. 5B alone, the bundle of carbon nanotubes 42 is shown after the vessel 20 (FIG. 1) has been pressurized with hydrogen (H$_2$) to a pressure of approximately 3,000–50,000 psi, and more preferably approximately 3,500–10,000 psi. The additional H$_2$ molecules 45 provided by the high-pressure environment are expected to occupy some of the vacant spaces in the nanotubes 42, and the pressure may also drive additional H$_2$ molecules 45 into interstitial spaces 46 between the nanotubes 42. Referring to FIGS. 1 and 5B together, the pressurized H$_2$ molecules 45 are also expected occupy a greater percentage of other areas of the vessel 20 that do not contain the storing medium 40.

The container 10 is expected to hold more H$_2$ molecules in a given volume than either carbon nanotube materials alone at a pressure under 3,000 psi or high-pressure vessels without an adsorbent storing medium. The carbon nanotube structure described in Dillon, A. C., et al. is expected to hold a high density of H$_2$ molecules, but it may have a significant unoccupied volume in the nanotubes and/or between the nanotubes. By installing a carbon nanotube storing medium, or another suitable storing medium, in a high-pressure vessel 20 and pressurizing the vessel above approximately 3,000 psi, additional H$_2$ molecules are driven into the vacant spaces within the vessel 20. The container 10, therefore, can likely provide an adequate energy density for hydrogen to become a convenient fuel for the transportation section.

The container 10 is also expected to provide an efficient and commercially viable storage system for hydrogen. One aspect of several embodiments of the container 10 is that the inlet/outlet line 50 extends through the complete length, or almost the complete length, of the cavity 30 of the vessel 20. It will be appreciated that the inlet/outlet line 50 can alternatively have branches that project widthwise from the line 50, as explained in more detail below with reference to FIG. 8. By placing the inlet/outlet line 50 across a significant portion of the cavity 30, the gaseous fuel can be easily distributed to a significant portion of the storing medium 40. Also, the embodiments of the container 10 having a porous line 50 are expected to provide a good interface for fluid communication between the line 50 and the storing medium 40. As such, several embodiments of the container 10 are expected to package the storing medium 40 within the vessel 20 in a manner that provides for quick fill-ups and unobstructed flow paths for the gaseous fuel.

The container 10 is also expected to provide a device that can be readily serviced. One aspect of vehicles is that the components should be serviceable to maintain adequate performance. In the case of storing H$_2$ molecules using an adsorbent, it may be necessary to change the adsorbent if it is faulty or wears out. The adsorbent, however, may be difficult to handle. By housing the storing medium 40 in modular cells 28, an individual cell 28 containing the storing medium can be replaced without having to directly handle the storing medium 40. Thus, individual cells 28 can be replaced or otherwise serviced without having to replace all of the storing medium 40 and without having to directly handle the storing medium 40.

Figure 6:
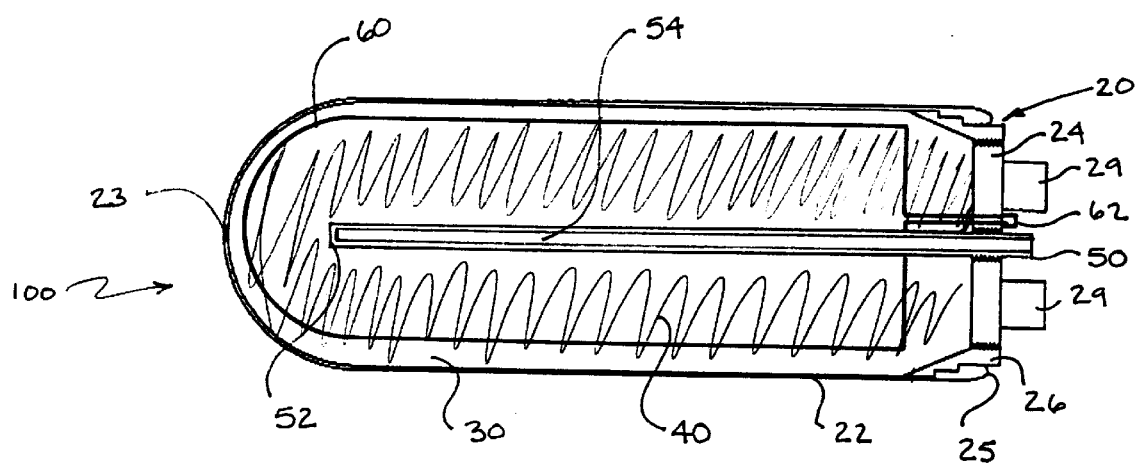
FIG. 6 is a cross-sectional view of a container for storing gaseous fuels in accordance with another embodiment of the invention.

FIG. 6 is a cross-sectional view of a container 100 for containing a gaseous fuel onboard a vehicle in accordance with another embodiment of the invention. The container 100 and the container 10 can be similar to each other, and thus like reference numbers refer to like components in FIGS. 1–6. The vessel 20 of the container 100 does not have a plurality of the dividers 27 in the cavity 30, but rather the container 100 has a generally unobstructed cavity 30. The storing medium 40, therefore, is not housed in separate cells 28. The container 100 can also have the inlet/outlet line 50 within the cavity 30 to provide a conduit for transporting the gaseous fluid. The container 100 is expected to operate in a manner similar to the container 10. The container 100, however, may be more difficult to manufacture because it does not include individual cells that may provide better containment of the storing medium 40.

Figure 7:
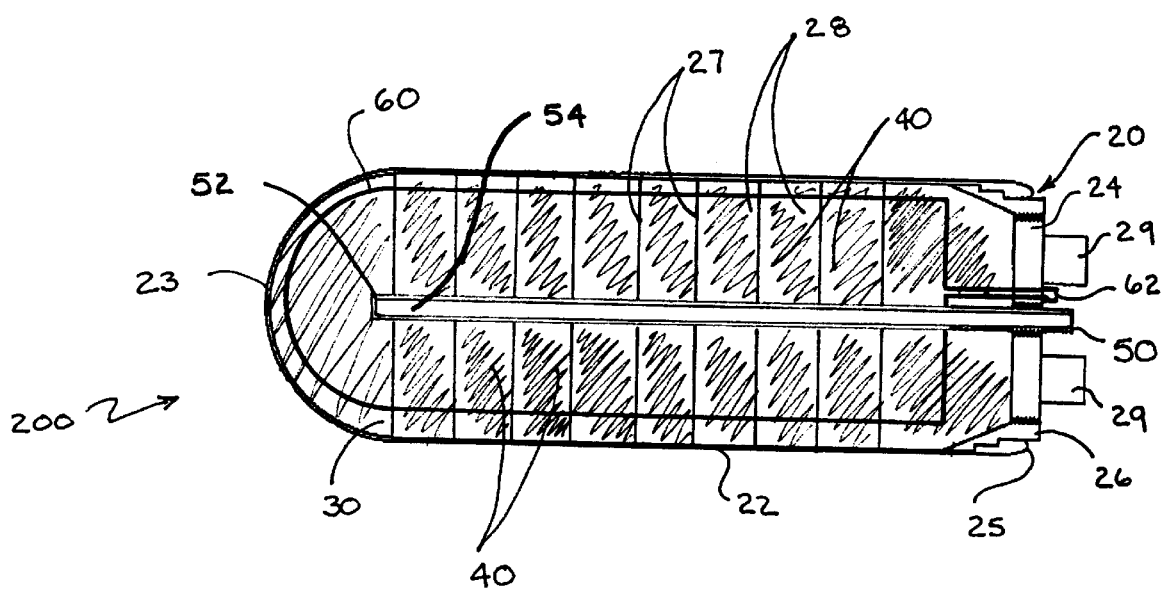
FIG. 7 is a cross-sectional view of a container for storing gaseous fuels in accordance with still another embodiment of the invention.

FIG. 7 is a cross-sectional view of a container 200 for containing a gaseous fuel onboard a vehicle in accordance with another embodiment of the invention. The container 200 and the container 10 can also be similar to each other, and thus like reference numbers also refer to like components in FIGS. 1–7. The container 200 also includes a plurality of the dividers 27 in the cavity 30, but the dividers 27 are configured so that the cells 28 occupy at least approximately the entire volume of the cavity. The storing medium 40 is housed in the cells 28. The cells 28 in FIG. 7, however, are not "modular" in the sense that the dividers 27 do not define individual compartments that can be removed from the vessel 20. The container 200 can also have the inlet/outlet line 50 within the cavity 30 to provide a conduit for transporting the gaseous fluid. The container 200 is expected to operate in a manner similar to the container 10.

Figure 8:
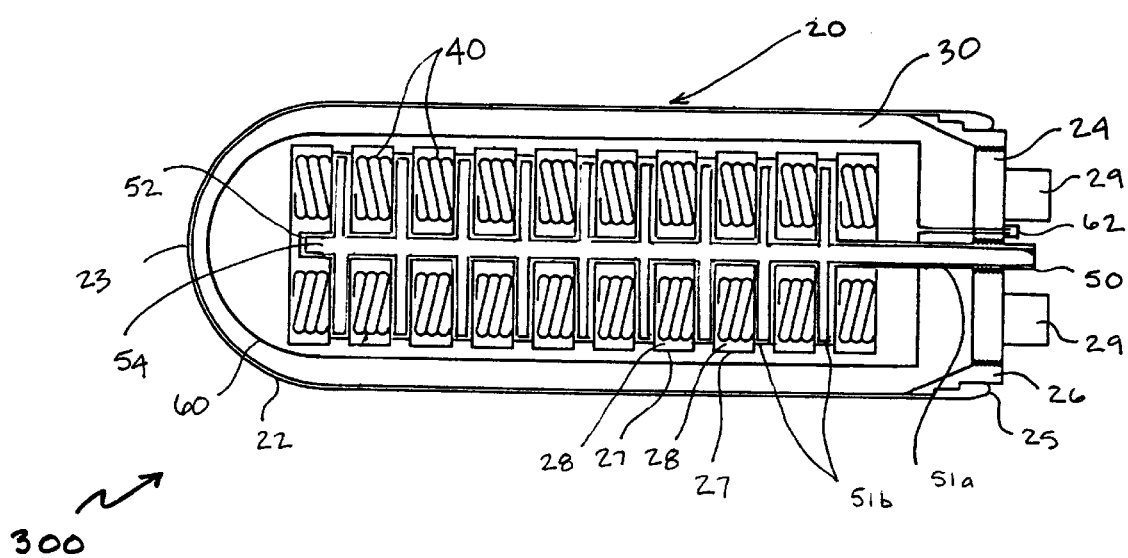
FIG. 8 is a cross-sectional view of a container for storing gaseous fuels in accordance with yet another embodiment of the invention.

FIG. 8 is a cross-sectional view of a container 300 for containing a gaseous fuel onboard a vehicle in accordance with another embodiment of the invention. The container 300 is also similar to the container 10, and thus like reference numbers refer to like components in FIGS. 1–8. The container 300 includes an inlet/outlet line 50 having a primary line 51a and at least one branch line 51b. The primary line 51a and the branch lines 51b can have walls 52 that define an internal channel 54. The walls 52 can have apertures (e.g., as described above with reference to FIG. 3) or they can be porous (e.g., as described above with reference to FIG. 4). The exterior of the walls 52 of the branch lines 51b can be dividers that define a portion of the cells 28. It will be appreciated that additional dividers 27 can be attached to the branch lines 51b to further define the cells 28. The inlet/outlet line 50 with the branch lines 51b is expected to provide a good distribution of the gaseous fuel to the storing medium 40 in the cells 28.

Figure 9:
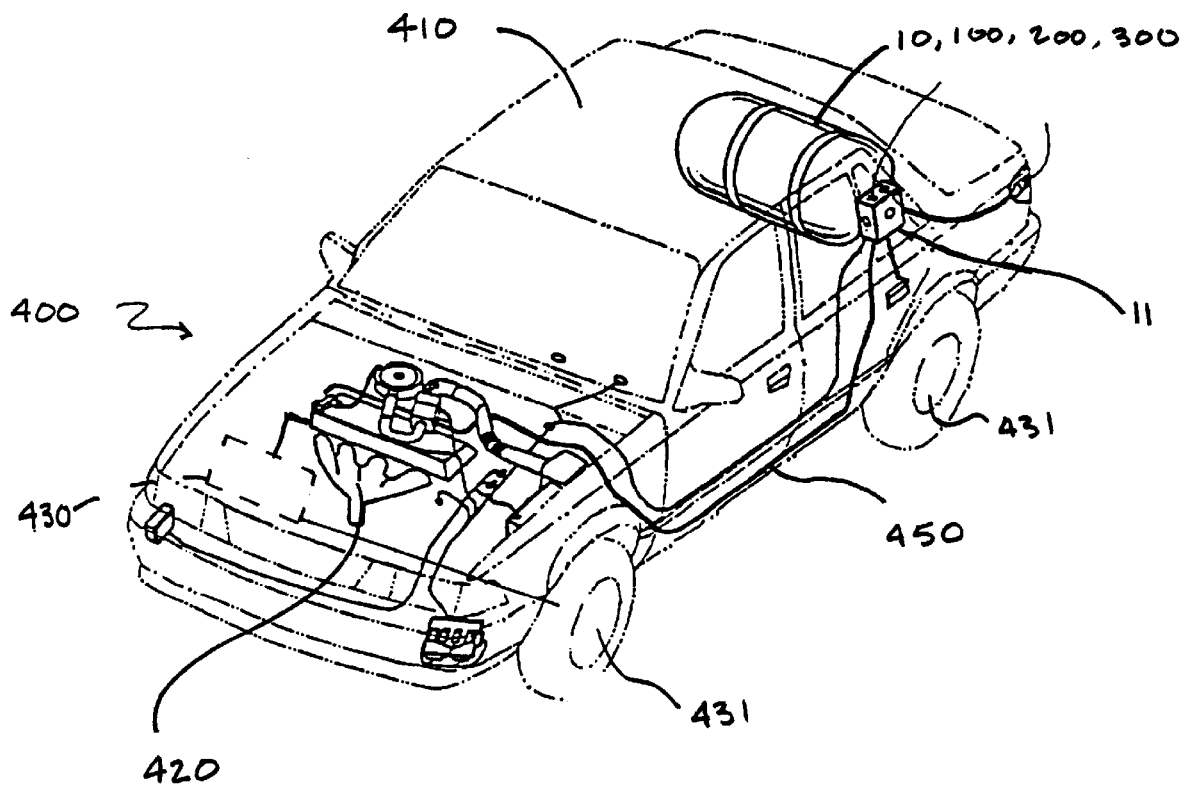
FIG. 9 is an isometric view of a vehicle having a container and delivery system for controlling a gaseous fuel in accordance with the invention.

FIG. 9 is an illustration of a vehicle 400 having a container, such as one of the embodiments of the containers 10, 100, 200 or 300 described above. The vehicle 400 can also have a chassis 410, an engine 420, and a drive system 430 (shown schematically) coupled to wheels 431. The engine 420 can be an internal combustion engine or an electric motor operated by fuel-cells, and the drive system 430 can be any suitable assembly for coupling the output from the engine 420 to the wheels 431. The vehicle 400 can also include an in-tank regular 11 coupled to the container 10, 100, 200 or 300, and a plurality of lines 450 coupling the regulator 11 to the engine 420. A suitable in-tank regulator is disclosed in U.S. Pat. No. 6,041,762, which is herein incorporated by reference. Additionally, suitable in-tank regulators, fuel injectors, injector pressure regulators, controllers, sensors and actuators for use in connection with the containers 10, 100, 200 and 300 are manufactured by IMPCO of Irvine, Calif.

From the foregoing, it will be appreciated that specific embodiments of the invention have been described herein for purposes of illustration, but that various modifications may be made without deviating from the spirit and scope of the invention. For example, the containers may have different shapes and be made from different materials than those disclosed above. Additionally, the storing medium can be comprised of materials other than carbon nanotubes, such as carbon fibers that have a small nano-structure, or other materials and structures that cause hydrogen molecules to bind to the surface of the storing medium. Moreover, in alternative embodiments, the inlet/outlet line can be configured differently than shown in FIGS. 1–8, and the extraction element can have several different configurations. The extraction element, for example, can have a plurality of individual heating elements extending through the vessel or a plurality of piezoelectric actuators disposed at different locations within the vessel. A person skilled in the art, therefore, will appreciate that the foregoing embodiments are merely examples of devices and methods in accordance with the invention, and that other embodiments of containers can be within the claimed subject matter. Accordingly, the invention is not limited except as by the following claims.

What is claimed is:

1. A container for storing a gaseous fuel, comprising:
   a high-pressure vessel configured to contain gas in a high-pressure zone at a pressure significantly above atmospheric pressure;
   a storing medium in the vessel, the storing medium having a plurality of storage spaces configured to bind molecules of the gas to the storing medium; and
   an inlet/outlet line extending through at least a portion of the vessel in fluid communication with the storing medium,
   wherein the high-pressure vessel comprises a composite shell having at least one open-end, and end-cover attached to the open-end of the shell to define the high-pressure zone, and a divider configured to separate the high-pressure zone into cells,
   wherein the composite she is a composite structure having a fiber-resin outer layer, a carbon-fiber inner layer, and a polymer liner inside of the carbon-fiber inner layer, and
   wherein the inlet/outlet line comprises a porous tube extending within the high-pressure zone and passing through the vessel.

2. A container of claim 1 wherein the storing medium is positioned in the cells and the storing medium comprises an adsorbent material comprising carbon nanotubes configured to absorb hydrogen molecules.

3. The container of claim 1, further comprising an extraction element in the vessel, wherein the extracting element is configured to detach $H_2$ molecules from the storing medium.

4. The container of claim 1, further comprising an extraction element defined by a heating element within the vessel.

5. A container for storing a gaseous fuel, comprising:
   a high-pressure vessel configured to contain gas in a high-pressure zone at a pressure significantly above atmospheric pressure;
   a storing medium in the vessel, the storing medium having a plurality of storage spaces configured to bind molecules of the as to the storing medium; and
   an inlet/outlet line extending through at least a portion of the vessel in fluid communication with the storing medium,
   wherein the high-pressure vessel comprises a composite shell having a closed-end and an open-end, and end-cover attached t the open-end of the shell to define the high-pressure zone, and a divider configured to separate the high-pressure zone into cells,
   wherein the composite shell is a composite structure having a fiber-resin outer layer, a carbon-fiber inner layer, and a polymer liner inside of the carbon-fiber inner layer,
   wherein the inlet/outlet line comprises a porous tube extending within the high-pressure zone and passing through the vessel, and
   wherein the container further comprises an extraction element defined by a heating element within the extraction zone.

6. The container of claim 5 wherein the storing medium comprises a porous material configured to adsorb hydrogen molecules.

7. A container for storing a gaseous fuel, comprising:
   a high-pressure vessel configured to contain gas in a high-pressure zone at a pressure significantly above atmospheric pressure;
   a storing medium in the vessel, the storing medium having a plurality of storage spaces configured to bind molecules of the gas to the storing medium; and
   an inlet/outlet line extending through at least a portion of the vessel in fluid communication with the storing medium,
   wherein the high-pressure vessel comprises a composite shell having a fiber-resin outer layer, a carbon-fiber inner layer, an a polymer liner inside of the carbon-fiber inner layer, and
   wherein the storing medium is an adsorbent comprising carbon nanotubes having an average pore size of approximately 40 Å.

8. A container for storing a gaseous fuel, comprising:
   a high-pressure vessel configured to contain hydrogen in a high-pressure zone at a pressure significantly above atmospheric pressure;
   a storing medium in the vessel, the storing medium having a plurality of storage spaces configured to bind hydrogen molecules to the storing medium; and
   an inlet/outlet line extending through at least a portion of the vessel in fluid communication with the storing medium,
   wherein the vessel comprises a composite shell having a closed-end and an open-end, an end-cover attached to the open-end of the shell to define the high-pressure zone, and a divider configured to separate the high-pressure zone into cells, and
   wherein the composite shell is a composite structure having a fiber-resin outer layer, a carbon-fiber inner layer, and a polymer liner inside of the carbon-fiber inner layer.

9. A container for storing a gaseous fuel, comprising:
   a high-pressure vessel configured to contain gas in a high-pressure zone at a pressure significantly above atmospheric pressure;
   a storing medium in the vessel, the storing medium having a plurality of storage spaces configured to bind molecules of the gas to the storing medium; and
   an inlet/outlet line extending through at least a portion of the vessel in fluid communication with the storing medium,
   wherein the vessel comprises a composite shell having a closed-end and an open-end, an end-cover attached to the open-end of the shell to define the high-pressure zone, and a divider configured to separate the high-pressure zone into cells, wherein the composite shell is a composite structure having a fiber-resin outer layer, a carbon-fiber inner layer, and a polymer liner inside of the carbon-fiber inner layer, and wherein the storing medium comprises a porous material configured to adsorb $H_2$ molecules.

10. A container for storing a gaseous fuel, comprising:

a high-pressure vessel configured to contain gas in a high-pressure zone at a pressure significantly above atmospheric pressure;

a storing medium in the vessel, the storing medium having a plurality of storage spaces configured to bind molecules of the gas to the storing medium; and an inlet/outlet line extending through at least a portion of the vessel in fluid communication with the storing medium, wherein the vessel comprises a composite shell having a closed-end and an open-end, an end-cover attached to the open-end of the shell to define the high-pressure zone, and a divider configured to separate the high-pressure zone into cells, wherein the composite shell is a composite structure having a fiber-resin outer layer, a carbon-fiber inner layer, and a polymer liner inside of the carbon-fiber inner layer, and wherein the inlet/outlet line comprises a porous conduit.

11. A container for storing a gaseous fuel, comprising:

a high-pressure vessel configured to contain the gas at a pressure above approximately 3,000 psi;

an adsorbent material in the vessel, the adsorbent material being configured to bind molecules of the gas to the adsorbent material; and an inlet/outlet line extending through at least a portion of the vessel in fluid communication with the adsorbent material, wherein the high-pressure vessel comprises a composite shell having a closed-end and an open-end, an -end-cover attached to the open-end of the shell to define the high-pressure zone, and a divider configured to separate the high-pressure zone into cells, wherein the composite shell is a composite structure having a fiber-resin outer layer, a carbon-fiber inner layer, and a polymer liner inside of the carbon-fiber inner layer, wherein the inlet/outlet line comprises a porous tube extending across a significant portion of the high-pressure zone passing through the vessel, and wherein the container further comprises an extraction element defined by a heating element within the extraction zone.

12. The container of claim 11 wherein the adsorbent material is positioned in the cells and comprises carbon nanotubes configured to adsorb hydrogen molecules.

13. The container of claim 11, further comprising an extraction element in the vessel, wherein the extraction element is configured to detach $H_2$ molecules from the adsorbent material.

14. The container of claim 11, further comprising an extraction element defined by a heating element within the vessel.

15. The container of claim 11 wherein the inlet/outlet line comprises a porous conduit.

16. The container of claim 11 wherein the inlet/outlet line comprises a perforated conduit.

17. A container for storing a gaseous fuel, comprising:

a high-pressure vessel configured to contain hydrogen gas at a pressure above approximately 3,000 psi;

an adsorbent material in the vessel, the adsorbent material being configured to bind hydrogen molecules to the adsorbent material;

an inlet/outlet line extending through at least a portion of the vessel in fluid communication with the adsorbent material; and an extraction element extending through at least a portion of the vessel, wherein the extraction element is configured to detach the gas molecules from the adsorbent material, wherein the high-pressure vessel comprises a composite structure having a fiber-resin outer layer, a carbon-fiber inner layer, and a polymer liner inside of the carbon-fiber inner layer.

18. The container of claim 17 wherein:

the high-pressure vessel includes a closed-end and an open-end, an end-cover attached to the open-end of the vessel to define the high-pressure zone, and a divider configured to separate the high-pressure zone into cells;

the adsorbent material is positioned in the cells and comprises carbon nanotubes configured to adsorb $H_2$ molecules;

the inlet/outlet line comprises a porous tube extending across a significant portion of the high-pressure zone and passing through the vessel; and the container further comprises an extraction element defined by a heating element within the extraction zone.

19. The container of claim 17, further comprising an extraction element in the vessel, wherein the extraction element is configured to detach $H_2$ molecules from the adsorbent material.

20. The container of claim 17, further comprising an extraction element defined by a heating element within the vessel.

21. The container of claim 17 wherein the inlet/outlet line comprises a porous conduit.

22. The container of claim 17 wherein the inlet/outlet line comprises a perforated conduit.

23. A container for storing a gaseous fuel, comprising:

a high-pressure vessel configured to contain the gas at a pressure above approximately 3,000 psi;

a plurality of dividers in the vessel configured to define a plurality of storage cells;

an adsorbent material in at least a portion of the storage cells, the adsorbent material comprising a plurality of carbon nanotubes to which gas molecules physically bind;

an inlet/outlet line extending through at least a portion of the vessel in fluid communication with the adsorbent material in the storage cells; and a heating element extending through at least a portion of the vessel, wherein the high-pressure vessel comprises a composite shell having a closed-end and an open-end, an end-cover attached to the open-end of the shell to define the high-pressure zone, and a divider configured to separate the high-pressure zone into cells, wherein the composite shell is a composite structure having a fiber-resin outer layer, a carbon-fiber inner layer, and a polymer liner inside of the carbon-fiber inner layer, and the inlet/outlet line comprise a porous tube extending across a significant portion of the high-pressure zone and passing through the vessel.

24. The container of claim 23 wherein the container further comprises an extraction element defined by a heating element within the extraction zone.

25. The container of claim 23 wherein the adsorbent material comprises a porous carbon material configured to adsorb hydrogen molecules.

26. The container of claim 23, further comprising an extraction element in the vessel, wherein the extraction element is configured to detach $H_2$ molecules from the adsorbent material.

27. The container of claim 23, further comprising an extraction element defined by a heating element within the vessel.

28. The container of claim 23 wherein the inlet/outlet line comprises a porous conduit.

29. The container of claim 23 wherein the inlet/outlet line comprises a perforated conduit.

30. A vehicle, comprising:
a chassis;
an engine configured to be powered by gaseous fuel;
a drive system having a transmission coupled to the engine and a plurality of wheels coupled to the transmission, wherein the drive system transfers output from the engine to the wheels; and
a container for storing gaseous fuel, the container comprising
a high-pressure vessel configured to contain the gas at a pressure significantly above atmospheric pressure;
a storing medium in the vessel, the storing medium having a plurality of storage spaces configured to bind molecules of the gas to the storing medium, said storing medium includes an adsorbent; and
an inlet/outlet line extending through at least a portion of the vessel in fluid communication with the storing medium,
wherein the high-pressure vessel comprises a composite shell having a closed-end and an open-end, an end-cover attached to the open-end of the shell to define the high-pressure zone, and a divider configured to separate he high-pressure zone into cells, and
wherein the composite shell is a composite structure having a fiber-resin outer layer, a carbon-fiber inner layer, and a polymer liner inside of the carbon-fiber inner layer.

31. The vehicle of claim 30,
wherein the storing medium is positioned in the cells and the storing medium comprises an adsorbent material comprising carbon nanotubes configured to adsorb $H_2$ molecules, and
wherein the inlet/outlet comprises a porous tube extending within the high-pressure zone and passing through the vessel.

32. The vehicle of claim 30, wherein the container further comprises an extraction element defined by a heating element within the extraction zone.

33. The container of claim 30, further comprising an extraction element in the vessel, wherein the extraction element is configured to detach $H_2$ molecules from the storing medium.

34. The container of claim 30, further comprising an extraction element defined by a heating element within the vessel.

35. The vehicle of claim 30, wherein the inlet/outlet line comprises a porous conduit.

36. The vehicle of claim 30, wherein the inlet/outlet line comprises a perforated conduit.

37. A vehicle, comprising:
a chassis;
an engine configured to be powered by a gaseous fuel;
a drive system having a transmission coupled to the engine and a plurality of wheels coupled to the transmission, wherein the drive system transfers output from the engine to the wheels; and
a container for storing the gaseous fuel, the container comprising
a high-pressure vessel configured to contain the gas at a pressure above approximately 3,000 psi;
an adsorbent material in the vessel, the adsorbent material being configured to bind gas molecules of the gas to the adsorbent material;
an inlet/outlet line extending through at least a portion of the vessel in fluid communication with the adsorbent material; and
an extraction element extending through at least a portion of the vessel, wherein the extraction element is configured to detach the gas molecules from the adsorbent material,
wherein the high-pressure vessel comprises a composite shell having a closed-end and an open-end, an end-cover attached to the open-end of the shell to define the high-pressure zone, and a divider configured to separate the high-pressure zone into cells,
wherein the composite shell is a composite structure having a fiber-resin outer layer, a carbon-fiber inner layer, and a polymer liner inside of the carbon-fiber inner layer, and
wherein the inlet/outlet line comprises a porous tube extending within the high-pressure zone and passing through the vessel.

38. The container of claim 37 wherein the container further comprises an extraction element defined by a eating element within the extraction zone.

39. The container of claim 37 wherein the adsorbent material comprises a porous carbon material configured to adsorb hydrogen molecules.

40. The container of claim 37, further comprising an extraction element in the vessel, wherein the extraction element is configured to detach $H_2$ molecules from the adsorbent material.

41. The container of claim 37, further comprising an extraction element defined by a heating element within the vessel.

42. The container of claim 37 wherein the inlet/outlet line comprises a porous conduit.

43. The container of claim 37 wherein the inlet/outlet line comprises a perforated conduit.

44. A vehicle, comprising:
a chassis;
an engine configured to be powered by a gaseous fuel;
a drive system having a transmission coupled to the engine and a plurality of wheels coupled to the transmission, wherein the drive system transfers output from the engine to the wheels; and
a container for storing the gaseous fuel, the container comprising
a high-pressure vessel configured to contain the gas at a pressure above approximately 3,000 psi;
a plurality of dividers in the vessel configured to define a plurality of storage cells;

an adsorbent material in at least a portion of the storage cells, the adsorbent material to which gas molecules bind;

an inlet/outlet line extending through at least a portion of the vessel in fluid communication with the absorbent material in the storage cells; and a heating element extending through at least a portion of the vessel, wherein the high-pressure vessel comprises a composite shell having a closed-end and an open-end, an end-cover attached to the open-end of the shell to define the high-pressure zone, and a divider configured to separate the high-pressure zone into cells, wherein the composite shell is a composite structure having a fiber-resin outer layer, a carbon-fiber inner layer, and a polymer liner inside of the carbon-fiber inner layer, and wherein the inlet/outlet line comprises a porous tube extending within the high-pressure zone and passing through the vessel.

45. The container of claim 44 wherein the container further comprises an extraction element defined by a heating element within the extraction zone.

46. The container of claim 44 wherein the adsorbent material comprises a porous carbon material configured to adsorb hydrogen molecules.

47. The container of claim 44, further comprising an extraction element in the vessel, wherein the extraction element is configured to detach $H_2$ molecules from the adsorbent material.

48. The container of claim 44, further comprising an extraction element defined by a heating element within the vessel.

49. The container of claim 44 wherein the inlet/outlet line comprises a porous conduit.

50. The container of claim 44 wherein the inlet/outlet line comprises a perforated conduit.

* * * * *